US012684412B2

(12) United States Patent
Zhang

(10) Patent No.: US 12,684,412 B2
(45) Date of Patent: Jul. 14, 2026

(54) METHOD AND APPARATUS FOR PROCESSING FRAME SYNCHRONIZATION DATA

(71) Applicant: Tencent Technology (Shenzhen) Company Limited, Shenzhen (CN)

(72) Inventor: Xinyu Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 302 days.

(21) Appl. No.: 18/385,178

(22) Filed: Oct. 30, 2023

(65) Prior Publication Data

US 2024/0064565 A1 Feb. 22, 2024

Related U.S. Application Data

(63) Continuation of application No. PCT/CN2023/073228, filed on Jan. 19, 2023.

(30) Foreign Application Priority Data

Mar. 22, 2022 (CN) .......................... 202210283912.9

(51) Int. Cl.
H04W 28/02 (2009.01)
H04W 24/10 (2009.01)

(52) U.S. Cl.
CPC ....... H04W 28/0289 (2013.01); H04W 24/10 (2013.01)

(58) Field of Classification Search
CPC .......................... H04W 28/0289; H04W 24/10
See application file for complete search history.

(56) References Cited

U.S. PATENT DOCUMENTS

| | | | | |
|---|---|---|---|---|
| 6,810,014 | B1 * | 10/2004 | Watanabe | ............... H04L 47/29 |
| 7,099,273 | B2 | 8/2006 | Ha et al. | |
| 2013/0272121 | A1 * | 10/2013 | Stanwood | ........... H04L 47/2475 |
| 2023/0300671 | A1 * | 9/2023 | Jian | .......................... H04L 47/12 |

FOREIGN PATENT DOCUMENTS

| | | |
|---|---|---|
| CN | 103391253 A | 11/2013 |
| CN | 109361566 A | 2/2019 |
| CN | 113271316 A | 8/2021 |

OTHER PUBLICATIONS

Apr. 26, 2023—(US) International Search Report PCT/CN2023/073228.

* cited by examiner

*Primary Examiner* — Ronald B Abelson
(74) *Attorney, Agent, or Firm* — Banner & Witcoff, Ltd.

(57) ABSTRACT

This application relates to a method and apparatus for processing frame synchronization data. The method includes: predicting a downlink network congestion trend based on a congestion condition of received downlink data frames; adjusting a report time interval of uplink data frames based on the downlink network congestion trend, the downlink network congestion trend being in direct proportion to the report time interval; transmitting the uplink data frames to a server based on the report time interval.

17 Claims, 7 Drawing Sheets

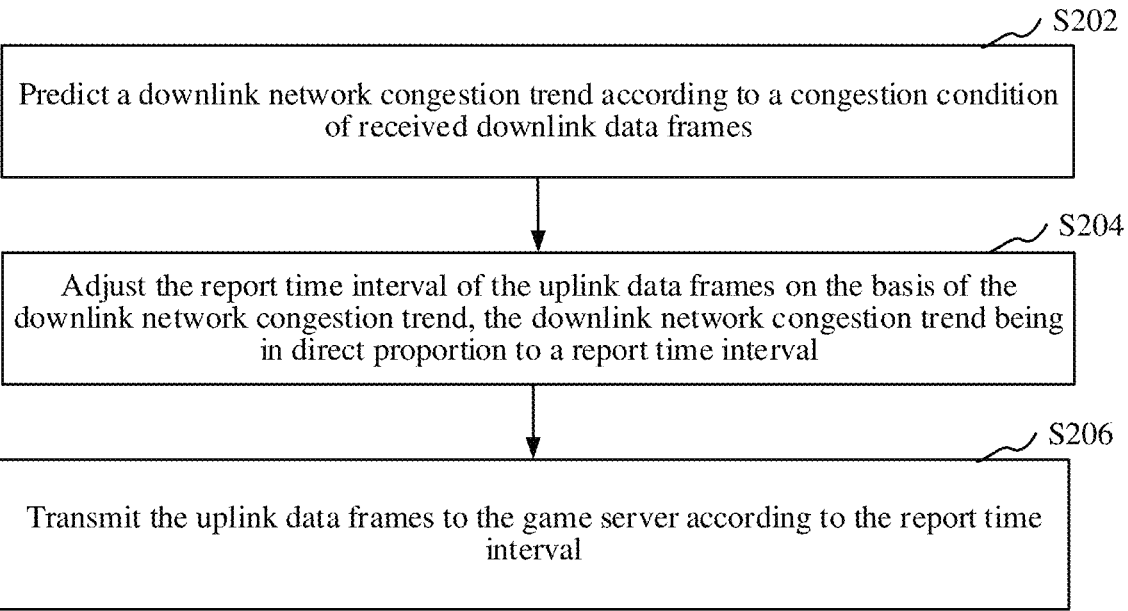

S202

Predict a downlink network congestion trend according to a congestion condition of received downlink data frames

S204

Adjust the report time interval of the uplink data frames on the basis of the downlink network congestion trend, the downlink network congestion trend being in direct proportion to a report time interval

S206

Transmit the uplink data frames to the game server according to the report time interval

FIG. 2

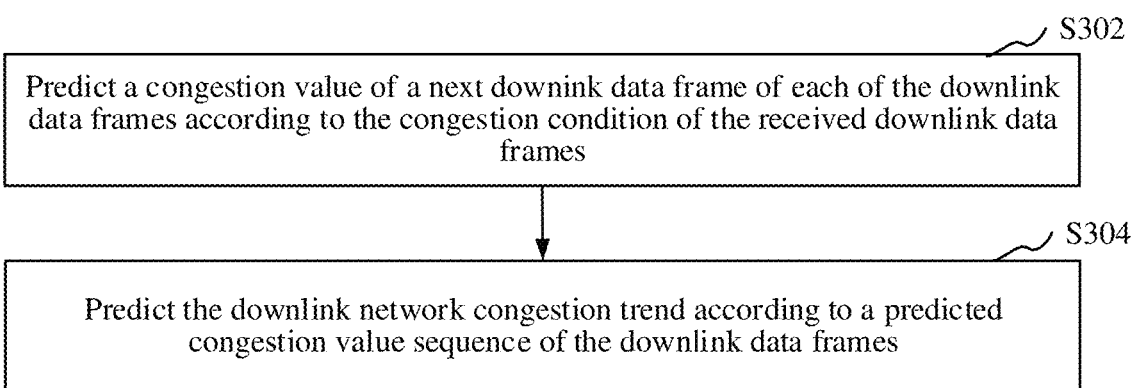

S302

Predict a congestion value of a next downink data frame of each of the downlink data frames according to the congestion condition of the received downlink data frames

S304

Predict the downlink network congestion trend according to a predicted congestion value sequence of the downlink data frames

Determine a congestion value of each downlink data frame according to a difference value between a receiving time interval of two consecutive downlink data frames and a fixed transmitting interval of the downlink data frames

S404

Predict the congestion value of the next downlink data frame according to the congestion value of the current downlink data frame and a current cumulative congestion value of the current downlink data frame

FIG. 4

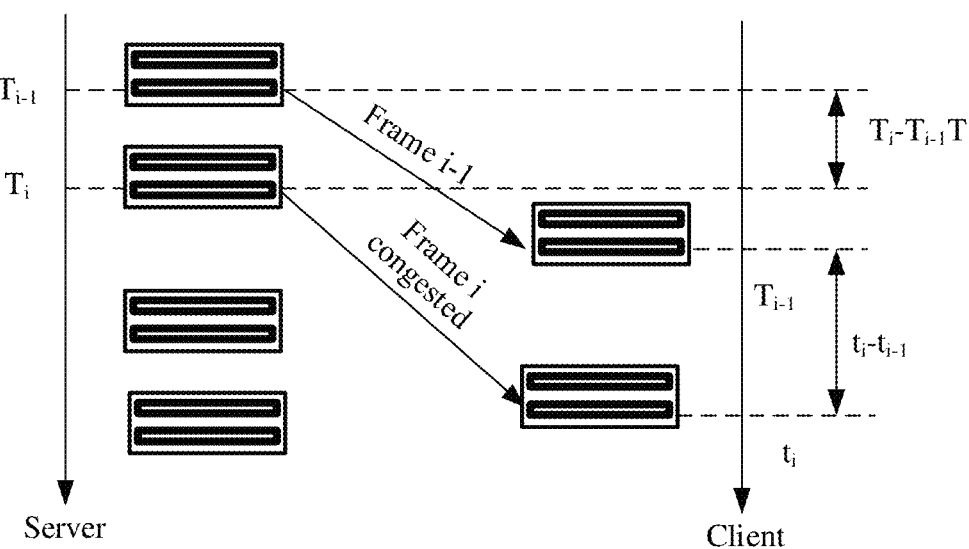

FIG. 5

Server

Fixed interval
downlink packets

Congestion control

Client

Collection
measurement
value

Predict the
congestion value
of the next
downlink data
frame

Operate uplink
packets

Use the least
square method
to calculate the
downlink
congestion trend

Report game
frames
according to the
report time
interval

Calculate a
report time
interval.

METHOD AND APPARATUS FOR PROCESSING FRAME SYNCHRONIZATION DATA

CROSS-REFERENCE TO RELATED APPLICATIONS

This application is a continuation of, and claims priority to PCT/CN2023/073228, filed on Jan. 19, 2023, which claims priority to Chinese Patent Application No. 2022102839129, entitled "METHOD AND APPARATUS FOR PROCESSING DATA IN FRAME SYNCHRONIZATION GAME, AND COMPUTER DEVICE" filed with the China National Intellectual Property Administration on Mar. 22, 2022, each of which is incorporated by reference in its entirety.

FIELD OF THE TECHNOLOGY

This application relates to the field of games and Internet technologies, and in particular, to a method and apparatus for processing data in a frame synchronization game, a computer device, a storage medium, and a computer program product.

BACKGROUND OF THE DISCLOSURE

Frame synchronization in games is a synchronization method for a client and a server, which is developed to achieve applications with high instantaneity and high synchronism. In a typical frame synchronization system, a server is responsible for broadcasting (forwarding) data of all clients. For continuous operation of a client, it is necessary to periodically transmit "data frames" to drive the client. When a player enters a command, data of an operation of the player would be filled into a network frame data packet. Therefore, a network condition also has a critical impact on synchronization of data frames. For example, in a strong network state, the network quality can meet or exceed the expectation, so that a network synchronization function can work normally. In a weak network state, the network quality cannot meet the expectation, or is even far below the expectation. As a result, network synchronization-based functions cannot work normally and even fail.

Most games on current markets have relatively few optimizations for weak networks. In weak networks, most methods merge of all operations of a frame at the server and transmit the all the operations at once, so that the purpose of controlling network congestion is achieved by reducing the transmitting frequency of the server.

However, when the transmitting frequency of the server is reduced, if packet loss occurs, a user would perceive a particularly significant network delay. Moreover, many operations cannot be sent out in a timely manner, which can also increase the system delay to a certain extent.

SUMMARY

According to various aspects of this application, a method and apparatus for processing frame synchronization data (e.g., in an online game). Computer devices, computer-readable storage media, and computer program products are provided to perform the method.

A first aspect provides a method for processing frame synchronization data, and the method comprises:

predicting a downlink network congestion trend based on a congestion condition of received downlink data frames;

adjusting a report time interval of uplink data frames based on the downlink network congestion trend, the downlink network congestion trend being in direct proportion to the report time interval; and transmitting the uplink data frames to a server (e.g., a game server) according to the report time interval.

A second aspect provides an apparatus for processing frame synchronization data the apparatus comprising concert configured to:

predict a downlink network congestion trend based on a congestion condition of received downlink data frames;

adjust a report time interval of uplink data frames based on of the downlink network congestion trend, the downlink network congestion trend being in direct proportion to the report time interval; and transmit the uplink data frames to a server based on the report time interval.

A third aspect provides a computer device, the computer device comprising memory and a processor, the memory storing computer-readable instructions, and the processor, when executing the computer-readable instructions, performing the method according to the first aspect and other aspects of the application or various implementations of the first aspect and other aspects of the application.

A fourth aspect provides a computer-readable storage medium, the computer-readable storage medium storing computer-readable instructions, and the computer-readable instructions, when executed by a processor, implementing the method according to the first aspect and other aspects of the application or various implementations of the first aspect and other aspects of the application.

According to a fifth aspect, this application further provides a computer program product. The computer program product includes computer-readable instructions, and the computer-readable instructions, when executed by a processor, implementing the method according to the first aspect and other aspects of the application or various implementations of the first aspect and other aspects of the application.

BRIEF DESCRIPTION OF THE DRAWINGS

To describe the technical solutions in the examples of this application or the traditional technology more clearly, the following briefly describes the accompanying drawings required for describing the examples or the traditional technology. Apparently, the accompanying drawings in the following descriptions show merely examples of this application, and a person of ordinary skill in the art may still derive other drawings from the disclosed accompanying drawings without creative efforts.

FIG. 2 is a flowchart of a method for processing frame synchronization data.

FIG. 3 is a flowchart of predicting a downlink network congestion trend according to a congestion condition of received downlink data frames.

FIG. 4 is a flowchart of predicting a congestion value of a next downlink data frame of each of the downlink data frames according to the congestion condition of the received downlink data frames.

FIG. 5 is a schematic diagram of calculating a congestion in a frame synchronization game.

DESCRIPTION OF EMBODIMENTS

The technical solutions of this application are clearly and completely described below with reference to the accompanying drawings of this application. Apparently, the described examples are merely some rather than all of the examples of this application. All other examples obtained by a person of ordinary skill in the art based on the examples of the present application without making creative efforts shall fall within the protection scope of the present application. While the context of the application is based on an online game, aspects of the application described herein could be applied to other areas that involve data transmission and synchronization.

Figure 1:
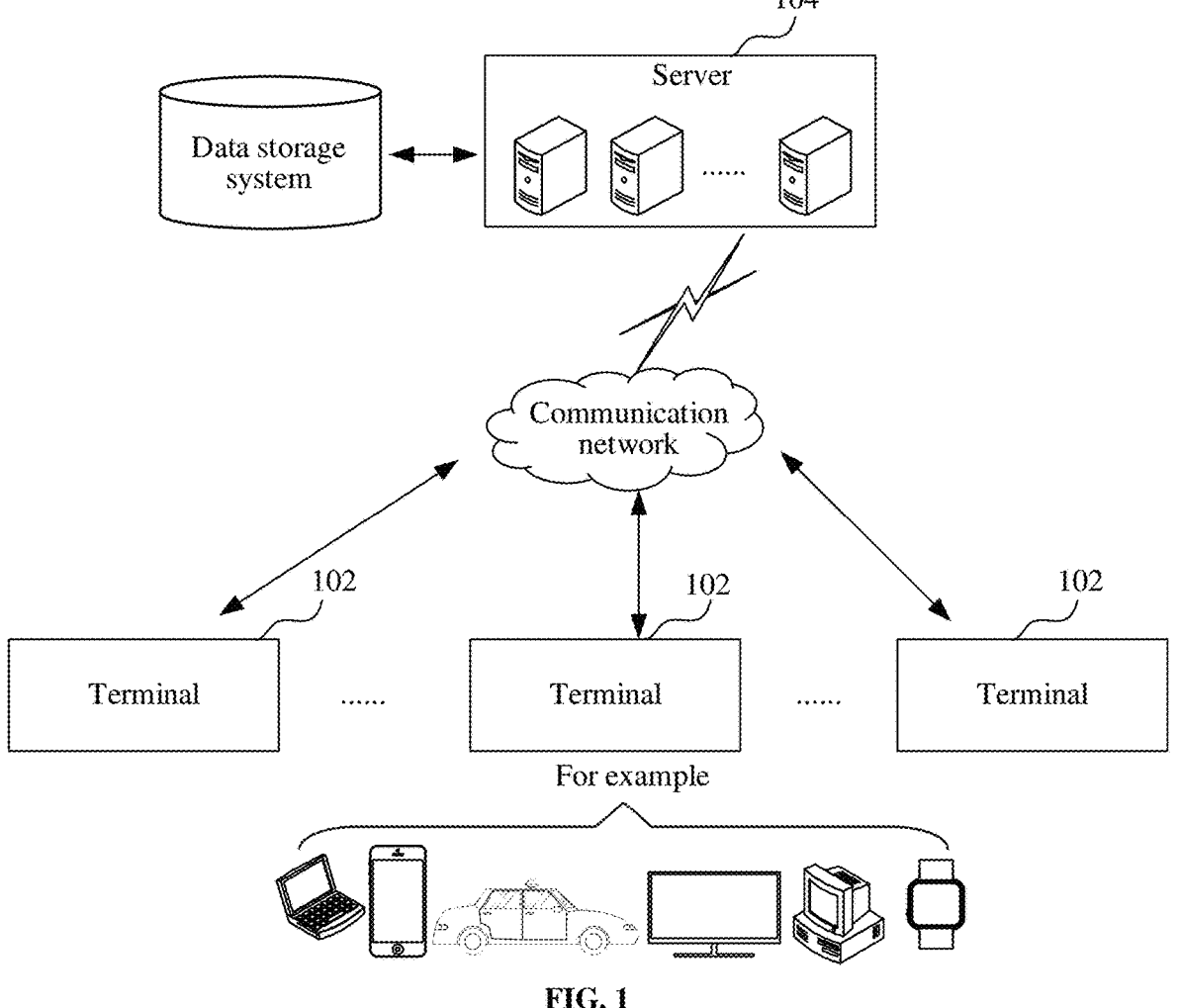
FIG. 1 is a diagram of an application environment of a method for processing frame synchronization data.

A method for processing data in a frame synchronization game can be applied to an application environment as shown in FIG. 1. A plurality of game terminals 102 may communicate with a game server 104 through a network. The data storage system can store data that needs to be processed by the server 104. A data storage system can be integrated on server 104, or placed on the cloud or other servers. The respective game terminals 102 may transmit data frames recording game operation content to the game server 104. The game server may aggregate the respective data frames to obtain a data frame, and transmit the data frame to the respective game terminals. The respective game terminals may synchronize game operations according to data frame synchronization. Specifically, the game terminals may predict a downlink network congestion trend according to a congestion condition of received downlink data frames; adjust a report time interval of uplink data frames on the basis of the downlink network congestion trend, the network congestion trend being in direct proportion to the report time interval; and transmit the uplink data frames to the game server according to the report time interval. Each game terminal 102 may comprise a mobile phone, a computer, an intelligent voice interaction device, a smart home appliance, a vehicle-mounted terminal, and/or the like. The server 104 may be implemented by using an independent server or a server cluster that includes a plurality of servers.

In one example, as shown in FIG. 2, a method for processing data in a frame synchronization game is described. Application of the method to the game terminal in FIG. 1 is taken as an example for explanation. The game terminal may perform one or more of the steps below. The method may comprise the following steps:

Step 202: Predict a downlink network congestion trend according to a congestion condition of received downlink data frames.

Frame synchronization is a processing technology that performs pixel-level synchronous displaying on synchronization sources. For a plurality of access points on a network, a signal may be synchronously transmitted to others through a host unit and synchronously displayed on various terminals. A synchronization signal may be pixel data of each frame or key event information that affects data changes.

When the frame synchronization technology is applied to games, a game server may mainly play a control role of performing frame control and input/output management on the game terminals. The game terminals may be terminals on which a game client is installed. The game client may provide a game program for game players.

Frames may be a control logic in a game world, comprising time and control commands of game players. Each game terminal may report data frames of operations of a game player to the game server in a time unit of frame. A data frame may comprise operations and states of a game player in a game terminal within unit time. For example, a data frame may comprise game operations of a game player and a loading state, security verification state, and cheating verification state between game terminals. The game server may aggregate the data frames of the respective game terminals at same time to obtain a downlink data frame and transmit the downlink data frame to the respective game terminals.

Downlink refers to transmission of data from the game server to the game terminals. The downlink data frame refers to a data frame transmitted by the game server to the respective game terminals, comprising the aggregated data frames, sent by the game server to the game terminals, of the respective game terminals (e.g., at the same time). The downlink data frame can comprise the operations and states of the game players.

The respective game terminals can synchronize the operations of the respective game players according to the downlink data frame. For example, the game server can aggregate the same data frames of game players in one game room in unit of game room to obtain a data frame of the game room, and transmit the data frame to game terminals of the respective game players in the game room, which synchronizes operations performed on the game terminals of the respective game players in the game room.

For example, there are three game players in a game room, and game terminals of the three game players report data frames of a first frame respectively to the game server. The game server aggregates the data frames of the first frame of the three game players to obtain a data frame of the game room, and transmits the data frame of the game room to the game terminals of the game players. The respective game terminals render the data frames to synchronize the operations of the respective game players at the respective game terminals.

Network congestion refers to a situation where a quantity of packets transmitted in a packet switched network is too large, resulting in a decrease in the network transmission performance due to limited resources of storage and forwarding nodes. Downlink network congestion refers to an over-use state of a network when a game server transmits data to a game terminal.

A congestion condition of the downlink data frames can be determined according to (e.g., based on) a time interval of receiving the downlink data frames by the game terminal. In the process of transmitting the downlink data frames, the downlink data frames may be transmitted at a fixed time interval. Correspondingly, the game terminal may receive the downlink data frames at a fixed receiving frequency. If there is no network congestion, a receiving time interval between two frames of downlink data frames of the game terminal may be fixed, which is consistent with a transmitting time interval of the downlink data frames. In the process of receiving the downlink data frames by the game terminal, if a congestion occurs, a time interval of receiving two frames of downlink data frames by the game terminal may become longer. When the time interval of receiving the downlink data frames by the game terminal becomes longer, it can be determined that a downlink network congestion has occurred. For example, a time interval of transmitting the downlink data frames by the game server is Ta (e.g., 0.01 second, 0.005 second). When the receiving time interval of the downlink data frames of the game terminal is greater than Ta, or when a difference value between the receiving time interval of the downlink data frame of the game terminal of the downlink data frames of the game terminal and Ta is greater than a threshold, it can be determined that a downlink network congestion has occurred. When the downlink network congestion occurs, it leads to a network delay. In this case, in a frame synchronization game, data frames cannot be received by the game terminal in a timely manner, and the game player can clearly perceive the network delay, which affects the user experience.

A downlink network congestion trend may represent a trend of increase or decrease in the degree of the downlink network congestion at a future time point or a time period. A delay variable $d(i)=w(i)$ of a downlink data frame delay may be considered as a sampling point in a random process W. Furthermore, it is a result of a combination of factors such as a link carrying capacity, a current network transmission state, and a current transmitting rate. If a network is in an over-use state, a value $w(i)$ of an expected delay variable will increase. If the network is in an under-use state, the value $w(i)$ of the expected delay variable will decrease. The random process W may be in a normal distribution. A downlink network congestion trend may be predicted according to a congestion value of the received downlink data frames transmitted by the game server.

Step 204: Adjust a report time interval of uplink data frames on the basis of the downlink network congestion trend, the downlink network congestion trend being in direct proportion to the report time interval.

The uplink data frames may be the data frames transmitted by the respective game terminals to the server, comprising the operations and states of the game players at the game terminals within unit time, such as the game operations of the game players and the loading states, security verification states, and cheating verification states between the game terminals.

Based on experience and experiments, there is a competitive relationship between uplink and downlink of the frame synchronization game in a weak network environment. In a weak network, the network quality cannot meet the expectation or is even far below the expectation because of environments and devices. As a result, network synchronization-based functions cannot work normally and even fail. The weak network comprises a 3G network, a High-Speed Packet Access (HSPA) network, an HSPA+ network, and the like.

In a strong network that is opposite to the weak network, the network quality can meet or exceed the expectation, so that a network synchronization function can work normally. A strong network comprises a Wifi network, a 4G network, a 5G network, and 6G network.

Relevant test data of both the strong network and the weak network in one example are shown in Table 1.

TABLE 1

| | | | | | theoretical | Actual | | Actual | |
| | | DL | UL | Packets processed per | maximum sending | test 1(sending | Packet loss | test 2 (sending | Packet loss |
| | System | (kpbs) | (kbps) | second | frequency | frequency) | result 1 | frequency) | result2 |
|---|---|---|---|---|---|---|---|---|---|
| Strong network | Wifi | — | — | — | — | 10 ms | No abnormality | 1 ms | No abnormality |
| | NR (New Radio) | 145000 | 60000 | 5132 | 0.2 ms | 10 ms | No abnormality | 1 ms | No abnormality |
| | LTE | 30000 | 15000 | 1283 | 0.8 ms | 10 ms | No abnormality | 1 ms | No abnormality |
| Weak network | HSPA+ | 13000 | 3400 | 291 | 3.4 ms | 10 ms | Uplink packet loss 2% Downlink packet loss 53% | 1 ms | Uplink packet loss 30% Downlink packet loss 100% |
| | HSPA | 4300 | 1800 | 154 | 6.5 ms | 10 ms | Uplink packet loss 13% Downlink packet loss 100% | 1 ms | Uplink packet loss 59% Downlink packet loss 100% |
| | 3G | 2800 | 384 | 32 | 31 ms | 10 ms | Uplink packet loss 75% Downlink packet loss 100% | 1 ms | Uplink packet loss 99% Downlink packet loss 100% |

From the above table, it can be seen that in the strong network, there are no abnormalities in uplink transmission and downlink transmission of the frame synchronization game. The downlink transmission comprises transmitting the data frames by the game server to the respective game terminals and the uplink transmission comprises transmitting the data frames by the respective game terminals to the game server. In the weak network, the uplink packet loss rate increases, and the downlink packet loss rate also increases. The downlink packet loss rate is greater than the uplink packet loss rate. It can be seen that in a weak network environment, there is a clear competitive relationship between the uplink and the downlink (e.g., the higher the uplink packet loss rate, the lower the downlink packet loss rate, and vice versa).

In a frame synchronization game, a server may cycle at a fixed frequency (such as 66 ms), receive uplink packets from clients within a period, pack the uplink packets, and then transmit the packed uplink packets to the respective clients. Therefore, based on an architecture of the frame synchronization game, there may be not only a network delay between the server and the clients, but also a fixed system delay. In the weak network environment, the competitive relationship exists between the uplink and the downlink. If the uplink transmission is not controlled to meet the requirements, an increase in the network delay of the downlink transmission may further increase the system delay.

Based on this, if there is a network congestion, in order to improve the user experience in the weak network situation and avoid the increase in the system delay caused by competition between the uplink and the downlink, a report time interval of the data frames may be adjusted on the basis of the network congestion trend. The network congestion trend may be in direct proportion to the report time interval.

The report time interval may be a time interval between two transmissions of the uplink data frames by the game terminals to the game server. The report time interval may be related to a report frequency. A smaller report frequency may indicate a longer report time interval. A larger report frequency may indicate a shorter report time interval.

Specifically, when the network congestion is in an uptrend, the report time interval may also increase. If the network congestion is in an uptrend, the report time interval of the game terminals may increase to avoid preempting of bandwidth resources of downlink packets caused by multiple transmissions of uplink packets.

For example, when it is predicted that the downlink network congestion is in the uptrend, the report time interval of the uplink data frames may be increased (e.g., the current report time interval may be prolonged). The report time interval can be gradually increased. For example, the report time interval may be increased by 6 ms at each time, and the congestion condition of the downlink data frames may be continued to be monitored to predict a downlink network congestion trend. If the downlink network congestion continues to be in the uptrend, the report time interval may be prolonged by 6 ms again.

Correspondingly, when the network congestion is in a downtrend, the report time interval may be also shortened. When the network congestion is in the downtrend, the report time interval of the uplink data frames of the game terminals may be shortened. For example, when it is predicted that the downlink network congestion is in the downtrend, the current report time interval may be shortened (e.g., the number of times of uplink packet transmissions may be increased), which effectively utilizes a change of network improvement.

Step 206: Transmit the uplink data frames to the game server according to the report time interval.

Specifically, each game terminal may actively adjust the uplink report time interval on the basis of the predicted network congestion trend and change its transmitting frequency of transmitting the uplink data frames in advance. The game terminal may wait to transmit uplink data frames if a time interval does not reach the report time interval. When the time interval satisfies the report time interval, the game terminal may report the uplink data frames to the game server.

The method for processing the data in the frame synchronization game described herein may comprise: predicting a downlink network congestion trend according to the congestion condition of the data frames that have been received (e.g., predicting the downlink network congestion trend in advance, and then adjusting the report time interval of the game terminals according to the predicted downlink network congestion trend). The network congestion trend may be in direct proportion to the report time interval. If the network congestion degree is in the uptrend, the report time interval may be increased. If the network congestion degree is in the downtrend, the report time interval may be shortened, thereby avoiding the situation of preempting of a bandwidth of the downlink packets caused by multiple transmissions of the uplink packets in case of the network congestion, reducing a delay of a frame synchronization link and improving the game operation experience.

In an example, before the operation of predicting a downlink network congestion trend according to a congestion condition of received downlink data frames, the method may further comprise: detecting network quality; and predicting, based on a determination, according to a network quality detection result, that the terminal is in a weak network environment, a downlink network congestion trend according to a congestion condition of received downlink data frames.

The method of this application may be implemented based on determining that the network quality is a weak environment. The network quality can be determined according to a network type, a packet loss rate, a delay, jitter, and/or the like.

The network type may be taken as an example for determining the network quality. If the terminal is in a 3G network, an HSPA network, or an HSPA+ network, it may be determined that the terminal is in a weak network environment.

The packet loss rate may be taken as an example for determining the network quality. If a calculated packet loss rate is greater than a preset value, it may be determined that the terminal is in a weak network environment.

The delay may be taken as an example for determining the network quality. If a detected delay is greater than a delay threshold, it may be determined that the terminal is in a weak network environment.

The jitter may be taken as an example for determining the network quality. If a detected jitter frequency is greater than a threshold, it may be determined that the terminal is in a weak network environment.

In this example, when it is detected that the terminal is in the weak network environment, the downlink network congestion trend can be predicted in advance. The report time interval of the game terminals can be adjusted according to the predicted downlink network congestion trend to avoid the situation of preempting of a bandwidth of the downlink packets caused by multiple transmissions of the uplink packets in the weak network. For example, the transmitting frequency may be changed in advance, so that a delay of an overall link can be reduced by the terminal in the weak network environment, and the operation experience of a user can be enhanced.

FIG. 3 shows a method of predicting a downlink network congestion trend according to a congestion condition of received downlink data frames. The method comprises the following steps:

Step 302: Predict a congestion value of a next downlink data frame of each of the downlink data frames according to the congestion condition of the received downlink data frames.

A congestion condition of the downlink data frames can be determined according to a time interval of receiving the downlink data frames by the game terminal. In the process of transmitting the downlink data frames, the downlink data frames may be transmitted at a fixed time interval. Correspondingly, the game terminal may receive the downlink data frames at a fixed receiving frequency. If there is no network congestion, a receiving time interval between two frames of downlink data frames of the game terminal may be fixed, which is consistent with a transmitting time interval of the downlink data frames. In the process of receiving the downlink data frames by the game terminal, if a congestion occurs, a time interval of receiving two frames of downlink data frames by the game terminal may become longer. Based on this, the congestion condition of the downlink data frames can be embodied (e.g., determined) according to the congestion values of the downlink data frames.

Specifically, in the frame synchronization game, in the process of transmitting the data frames by the game server, data frames and data packets may be transmitted at a fixed frequency. In the process of receiving the data frame and the data packets by the game terminals, if a network congestion occurs, a receiving interval will change. If a downlink network is not congested, the transmitting time interval of the downlink data frames may be consistent with the receiving time interval of the downlink data frames. For example, when the difference value between the transmitting time interval of the downlink data frames and the receiving time interval of the downlink data frames is equal to 0, it may indicate that the downlink network is not congested. If the receiving time interval of the downlink data frames is longer than the transmitting time interval (e.g., when the difference value between the receiving time interval of the downlink data frames and the transmitting time interval of the downlink data frames is greater than 0), it may indicate that the downlink network is congested.

The difference value between the receiving time interval of the downlink data frames and the transmitting time interval of the downlink data frames may be the congestion value of the downlink data frame.

A delay variable of the network congestion may conform to a normal distribution. Specifically, the network congestion value of each frame may be used as a delay variable. The delay variable $d(i)=w(i)$ may be considered as a sampling point in a random process W. Furthermore, it may be a result of a combination of factors such as a link carrying capacity, a current network transmission state, and a current transmitting rate. If a network is in an over-use state, an expected collection value $w(i)$ may increase. If the network is in an under-use state, the expected collection value $w(i)$ may decrease. It can be seen that the random process W may conform to the normal distribution.

Meanwhile, if a game terminal receives the data frames at a slower speed because a network congestion occurs in one stage, the game terminal receives the data frames at a higher speed in a next stage when the network condition is improved. Therefore, in the long run, a cumulative congestion value tends to be 0.

Due to the above two characteristics, it can be inferred that in frame synchronization, the cumulative congestion values of a certain segment of the network may increase continuously according to a certain slope, and a slope trend of each segment is inconsistent. Therefore, the congestion value of the next downlink data frame can be predicted according to the cumulative congestion value of the current data frame.

Step 304: Predict the downlink network congestion trend according to a predicted congestion value sequence of the downlink data frames.

The predicted congestion value sequence of the downlink data frames may be the congestion values of a plurality of consecutive downlink data frames. For example, the predicted congestion value sequence of the downlink data frames may comprise 10 predicted congestion values of the downlink data frames. Curve fitting can be performed according to a segment of predicted congestion values of the downlink data frames to predict the downlink network congestion trend. The network congestion trend may represent a trend of increase or decrease in the degree of the downlink network congestion within a future time period, a time period, and/or a future time point.

In this example, by using the characteristics of the congestion values of the downlink data frames, the congestion value of each next downlink data frame can be reasonably and accurately predicted, so that the downlink network congestion trend can be predicted in advance according to the predicted congestion value sequence of the downlink data frames.

In another example, the step of predicting a congestion value of a next downlink data frame of each of the downlink data frames according to the congestion condition of the received downlink data frames, as shown in FIG. 4, may comprise:

Step 402: Determine a congestion value of each downlink data frame according to a difference value between a receiving time interval of two consecutive downlink data frames and a fixed transmitting interval of the downlink data frames.

In the frame synchronization game, in the process of transmitting the data frames by the game server, as shown in FIG. 5, data frames and data packets may be transmitted at a fixed frequency. At a fixed transmitting frequency, a fixed transmitting time interval of the downlink data frames is $T(i)-T(i-1)$. In the process of receiving the data frames and the data packets by the game terminals, if network congestion occurs, the receiving interval may change, and the receiving time interval of the downlink data frames is $t(i)-t(i-1)$. If a downlink network is not congested, the transmitting time interval of the downlink data frames may be consistent with the receiving time interval of the downlink data frames. For example, when the difference value between the transmitting time interval of the downlink data frames and the receiving time interval of the downlink data frames is equal to 0, it may indicate that the downlink network is not congested. If the receiving time interval of the downlink data frames is longer than the transmitting time interval (e.g., when the difference value between the receiving time interval of the downlink data frames and the transmitting time interval of the downlink data frames is greater than 0), it may indicate that the downlink network is congested.

The difference value between the receiving time interval of the downlink data frames and the transmitting time interval of the downlink data frames may be the congestion value of the downlink data frame. The congestion value of each downlink data frame may be:

$$d(i)=t(i)-t(i-1)-(T(i)-T(i-1))$$

Step 404: Predict the congestion value of the next downlink data frame according to the congestion value of the current downlink data frame and a current cumulative congestion value of the current downlink data frame.

The cumulative congestion value may be cumulation of the congestion values of a plurality of data frames. The current cumulative congestion value may be cumulation of the congestion values from the first data frame to the current data frame. A calculation formula of the current cumulative congestion value is: acc_d(i)+=d(i), where acc_d(i) represents the current cumulative congestion value, and d(i) represents the congestion value of an $i^{th}$ downlink data frame.

A delay variable of the network congestion may conform to a normal distribution. Specifically, the network congestion value of each frame is used as a delay variable. The delay variable d(i)=w(i) is considered as a sampling point in a random process W. Furthermore, it is a result of a combination of factors such as a link carrying capacity, a current network transmission state, and a current transmitting rate. If a network is in an over-use state, an expected collection value w(i) may increase. If the network is in an under-use state, the expected collection value w(i) may decrease. It can be seen that the random process W may conform to the normal distribution.

If a game terminal receives the data frames at a slower speed because a network congestion occurs in one stage, the game terminal receives the data frames at a higher speed in a next stage when the network condition is improved. Therefore, in the long run, a cumulative congestion value tends to be 0.

Due to the above two characteristics, it can be inferred that in frame synchronization, the cumulative congestion values of a certain segment of the network may increase continuously according to a certain slope, and a slope trend of each segment is inconsistent. Therefore, the congestion value of the next downlink data frame can be predicted according to the cumulative congestion value of the current data frame.

In this example, the congestion values of the downlink data frames can be accurately predicted on the basis of the distribution characteristic of the network congestion and the change characteristic of the cumulative congestion values by calculating the congestion values of the downlink data frames.

In another example, the step of predicting the congestion value of the next downlink data frame according to the congestion value of the current downlink data frame and a current cumulative congestion value of the current downlink data frame may comprise: performing exponential smoothing processing on the congestion value of the current downlink data frame and the cumulative congestion value of the current downlink data frame, and predicting the congestion value of the next downlink data frame, a weight of the congestion value of the current data frame being greater than a weight of the cumulative congestion value of the current downlink data frame.

In the frame synchronization game, the congestion values of the downlink data frames of a period of time may conform to the characteristics of the normal distribution. Based on this, it can be inferred that in frame synchronization, the cumulative congestion values of a certain segment of the network increase continuously according to a certain slope, and a slope trend of each segment may be inconsistent.

Figure 6:
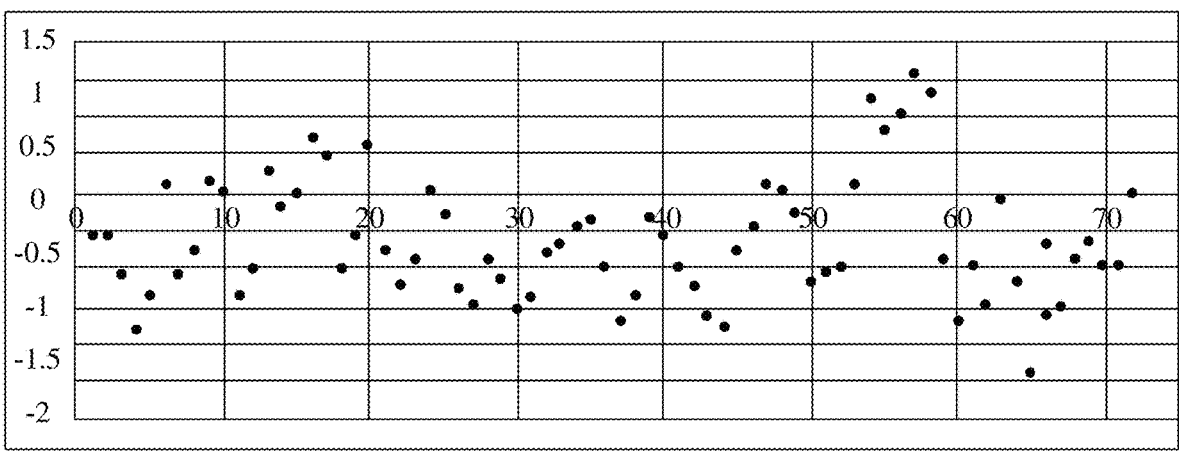
FIG. 6 is a schematic diagram of changes in congestion values of data frames.

Actual measured changes in the congestion values of the downlink data frames of a segment are shown in FIG. 6, which are relatively scattered and irregular. In this example, the congestion value of the next downlink data frame may be predicted using an exponential smoothing method on the basis of the characteristic that the overall rule of the congestion values of the downlink data frames conforms to linear prediction.

Specifically, the exponential smoothing method may be actually a special weighted moving average method. This method has the characteristics below: Firstly, the exponential smoothing method further enhances the effect of recently observed values during an observation period on predicted values. Weights assigned to observed values at different time may be unequal, thereby increasing the weights of the recently observed values, so that the predicted values to quickly reflect the actual changes. The weights may be reduced in geometric progression. A first term of this progression may be a smoothing constant a, and a common ratio is (1−a). Secondly, the exponential smoothing method has scalability for the weights assigned to the observed values, and different values of a can be used to change a change rate of the weights. If a is a small value, the weight may change quickly, and a recent change trend of the observed values can be reflected more quickly in exponential moving average values. Therefore, by using the exponential smoothing method, different values of a can be selected to adjust the uniformity of the observed values of the time series (e.g., the smoothness of trend changes).

Single exponential smoothing may be as follows:

$$s\_d(i)=a*s\_d(i-1)+(1-a)*acc\_d(i),$$

where s_d is the predicted cumulative congestion value of the downlink data frame, which reflects queuing delay information of the data packets passing through a network link and can reflect the deflation of a network queue. A predicted value is a weighted sum of previous observed values, where a and 1−a are weight coefficients, and different weights are assigned to different data. Specifically, the weight of the congestion value of the current downlink data frame may be greater than the weight of the current cumulative congestion value. The congestion value of the next frame may be predicted using the exponential smoothing method.

A time constant τ can be used to perform reverse inference to determine a reasonable value of a. Therefore, the weight of the predicted cumulative congestion value of the previous downlink data frame and the weight of the cumulative congestion value of the current data frame may be determined.

Specifically, according to an experiment, the time constant of the whole formula is 110 ms; the stabilization time is 440 ms; a signal value at time t is 1; 0.63 is contributed after 110 ms, and 0.99 is contributed after 440 ms. It can be considered as no contribution subsequently. Therefore, if the value of a is determined to be 0.6, the formula of the single exponential smoothing is:

$$s\_d(i)=0.6*s\_d(i-1)+(1-0.6)*acc\_d(i)$$

Figure 7:
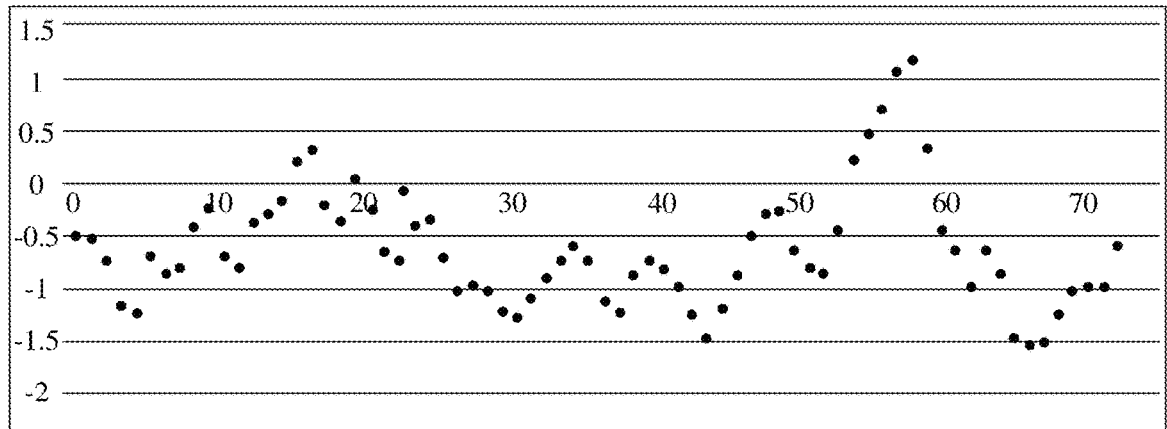
FIG. 7 is a schematic diagram of obtaining smoothed changes in the congestion values of the data frames by performing smoothing processing on the changes in the congestion values of the data frames of FIG. 6.

After the changes in the congestion values of the downlink data frames in FIG. 6 using the above formula is smoothed, as shown in FIG. 7, it can be seen from FIG. 7 that after the exponential smoothing, there are obvious peaks and valleys in the changes in the congestion values of the downlink data frames.

In this example, the congestion value of the next downlink data frame may be predicted using the exponential smoothing method on the basis of the characteristic that the overall rule of the congestion values of the downlink data frames conforms to linear prediction, so that the prediction accuracy of the congestion values of the downlink data frames can be improved.

In another example, the step of predicting the downlink network congestion trend according to a predicted congestion value sequence of the downlink data frames may comprise: calculating a slope regression coefficient according to the predicted congestion value sequence of the downlink data frames; predicting, based on a determination that the slope regression coefficient is greater than 0, that the downlink network congestion is in an uptrend; and predicting, based on a determination that the slope regression coefficient is less than 0, that the downlink network congestion is in a downtrend.

Specifically, the predicted congestion value sequence of the downlink data frames refers to the congestion values of a plurality of consecutive downlink data frames. As shown in FIG. 7, after the single exponential smoothing is used, there are significant peaks and valleys in the changes of the predicted congestion values of the downlink data frames. The network congestion values of the downlink data frames of a certain segment may show a linear change, and the slope trend of each segment may be inconsistent. Based on this, the downlink network congestion trend can be predicted according to a predicted congestion value sequence of the downlink data frames of each segment. The predicted congestion value sequence of the downlink data frames that includes the congestion values of 10 smoothed downlink data frames is taken as an example. As shown in FIG. 7, average values of horizontal and vertical coordinates are calculated according to the horizontal and vertical coordinates of the 10 data frames. The horizontal coordinate represents the number of frames, and the vertical coordinate represents the congestion value.

The least squares method may be used to calculate a slope regression coefficient according to the average values of the horizontal and vertical coordinates of the congestion values of the respective data frames. Specifically, the numerator of the slope regression coefficient is:

$$numerator+=(p.X-averagex)*(p.Y-averagey);$$

the denominator of the slope regression coefficient is:

$$denominator+=(p.X-averagex)*(p.X-averagex); \text{ and}$$

the slope regression coefficient is:

$$trend=numerator/denominator.$$

Figure 8:
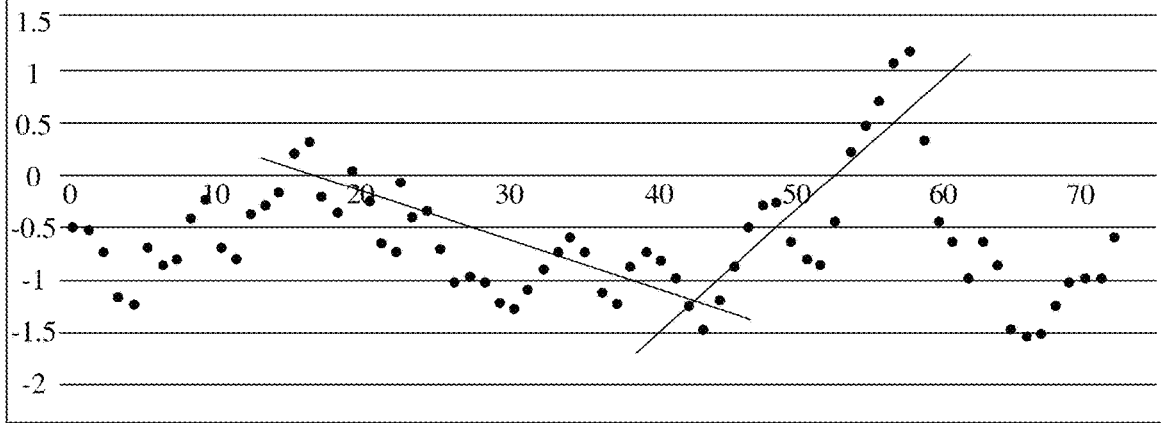
FIG. 8 is a schematic diagram of a slope calculated by the congestion values of the data frames.

When the slope regression coefficient is greater than 0, it may indicate that the network congestion in a link decreases, and it may be predicted that the network congestion is in an uptrend. When the slope regression coefficient is less than 0, it may indicate that the network congestion in a link decreases, and it may be predicted that the network congestion is in a downtrend. As shown in FIG. 8, the slope regression coefficient of the congestion values of the data frames within each time period can be finally calculated to predict the downlink network congestion trend.

In this example, the slope regression coefficient may be calculated using the predicted congestion value sequence of the downlink data frames, and then the network congestion trend may be characterized by the slope regression coefficient. This method may be in line with the change trend of the congestion values of the downlink data frames within a period of time, thus accurately predicting the network congestion trend.

In another example, the step of adjusting a report time interval of uplink data frames on the basis of the downlink network congestion trend may comprise: adjusting, on the basis of the downlink network congestion trend, a transmitting frequency reported by the uplink data frames, where the transmitting frequency is decreased based on a determination that the downlink network congestion is in an uptrend, and the transmitting frequency is increased based on a determination that the downlink network congestion is in a downtrend; and determining the report time interval of the data frames according to the adjusted transmitting frequency.

Specifically, the transmitting frequency may be in reverse proportion to the report time interval. A low transmitting frequency may indicate a long report time interval. A high transmitting frequency may indicate a short report time interval. When the downlink network congestion is in the uptrend, the transmitting frequency may decrease, and the report time interval may increase. When the downlink network congestion is in the down trend, the transmitting frequency increases, and the report time interval decreases. In one example, the report time interval is: min(T)=66 ms/transmitting frequency, where 66 ms is a fixed transmitting frequency of the game server.

A decrease adjustment amount of the transmitting frequency may be greater than an increase adjustment amount of the transmitting frequency. For example, when the slope regression coefficient is less than 0, the transmitting frequency may be increased. During adjustment, one more transmission may be added at each time till 10 times per frame.

When the slope regression coefficient is greater than 0, the transmitting frequency is decreased. For example, the transmitting frequency is directly reduced by half, and rounding down is performed until 1 time per frame.

The decrease adjustment amount of the transmitting frequency is greater than the increase adjustment amount of the transmitting frequency, which has the effect of slow increase and fast decrease, so that the adjustment is more sensitive.

Figure 9:
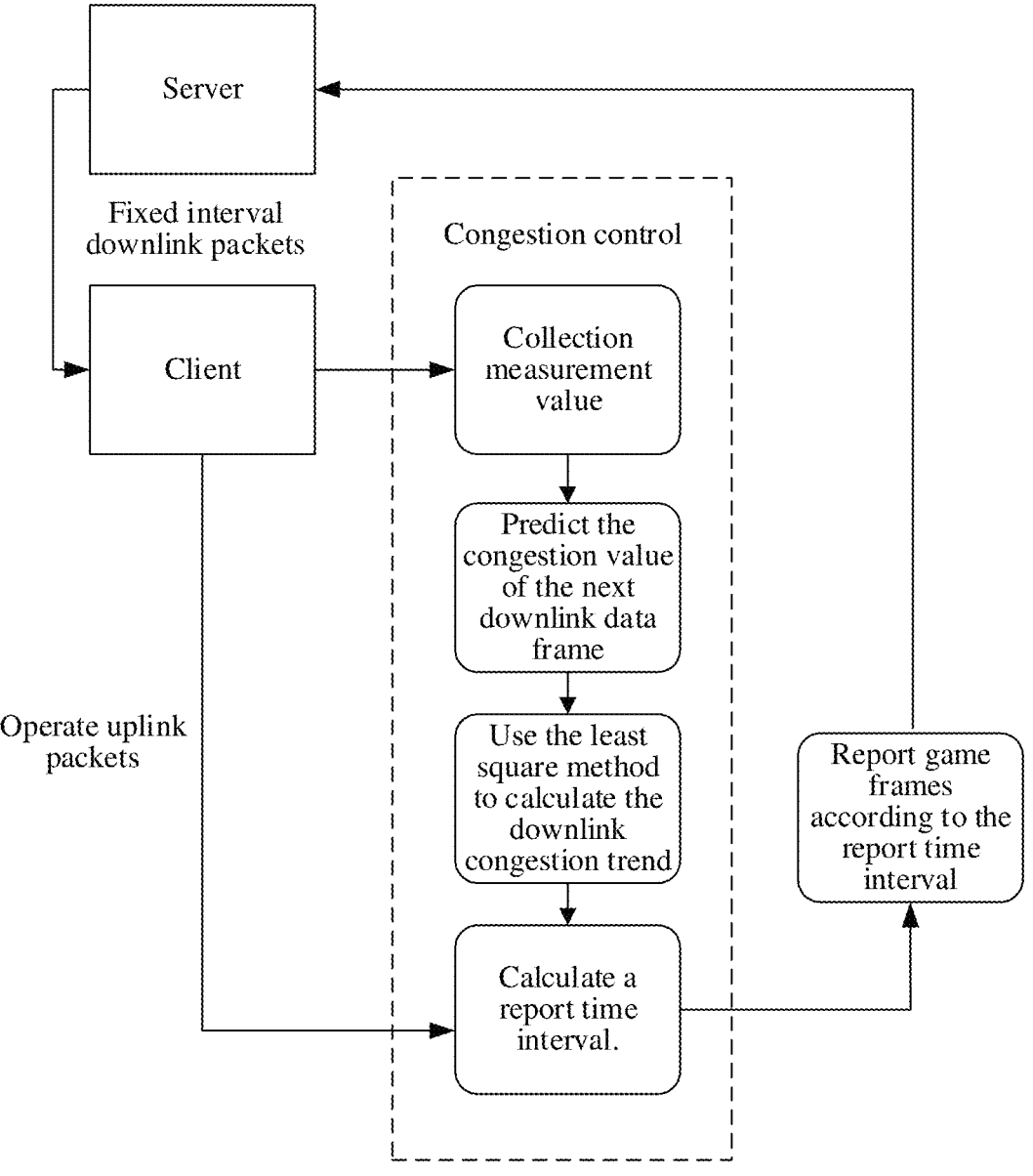
FIG. 9 is a flowchart of a method for processing data in a frame synchronization game.

In one example, in a method for processing the data in the frame synchronization game, as shown in FIG. 9, game terminals may report data frames to a game server, and the game server may transmit downlink data frames to the game terminals at a fixed interval. Each game terminal may detect the network quality. According to a network quality detection result that the terminal is in a weak network environment, a congestion value of each downlink data frame may be determined according to a difference value between a receiving time interval of two consecutive downlink data frames and a fixed transmitting interval of the downlink data frames. A congestion value of a next downlink data frame may be predicted according to the congestion value of the current downlink data frame and a current cumulative congestion value. A downlink network congestion trend may be predicted according to the predicted congestion value sequence of the downlink data frames. A report time interval of uplink data frames may be adjusted on the basis of the downlink network congestion trend, where the downlink network congestion trend may be in direct proportion to the report time interval. The uplink data frames may be transmitted to the game server according to the report time interval.

Specifically, exponential smoothing processing may be performed on the congestion value of the current downlink data frame and the cumulative congestion value of the current downlink data frame, and the congestion value of the next downlink data frame may be predicted, where a weight of the congestion value of the current data frame may be greater than a weight of the cumulative congestion value of the current downlink data frame.

Specifically, a slope regression coefficient may be calculated according to the predicted congestion value sequence of the downlink data frames. Based on a determination that the slope regression coefficient is greater than 0, the downlink network congestion may be predicted to be in an uptrend. Based on a determination that the slope regression coefficient is less than 0, the downlink network congestion may be predicted to be in a downtrend.

The report time interval of the uplink data frames may be adjusted on the basis of the downlink network congestion trend. Specifically, a transmitting frequency reported by the uplink data frames may be adjusted on the basis of the downlink network congestion trend, where the transmitting frequency is decreased if the downlink network congestion is in an uptrend, and the transmitting frequency may be increased if the downlink network congestion is in a downtrend; and the report time interval of the uplink data frames may be determined according to the adjusted transmitting frequency.

The method of this application may be used to test the method for processing the data in the frame synchronization game in the weak network environment. For example, in an HSPA++ network, data is transmitted every 10 ms.

Figure 10:
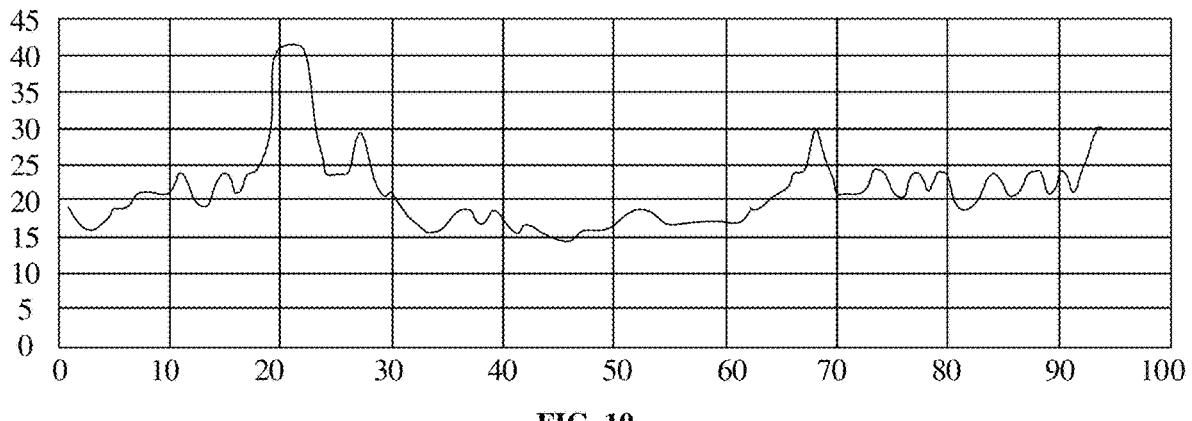
FIG. 10 is a schematic diagram of adjusted transmitting intervals at respective time points under a weak network environment.

After the method of this application is implemented, as shown in FIG. 10, the transmitting interval of the uplink data frames is basically automatically maintained at about 25 ms. This value is close to an actually measured bottleneck of uplink transmission in an H+ network (no packet loss in the downlink). It indicates that this algorithm successfully automatically finds an optimal upper limit of the transmitting frequency in the weak network environment.

It can be seen that the method of this application can solve the problem of preempting of a bandwidth of downlink packets caused by multiple transmissions of uplink packets of the frame synchronization game in the weak network. The prediction method is adopted. The transmitting frequency is changed in advance according to a predicted future network state, which improves the operation experience of a user in a weak network environment and reduces the delay of an overall link.

It is understood that although the steps in the flowcharts of the various examples mentioned above are displayed in sequence according to the instructions of the arrows, these steps are not necessarily performed in sequence according to the sequence indicated by the arrows. Unless otherwise explicitly specified in this application, execution of the steps is not strictly limited, and the steps may be performed in other sequences. Moreover, at least some of the steps in the flowcharts of the various examples may include a plurality of steps or a plurality of stages. These steps or stages are not necessarily performed at the same moment but may be performed at different moments. Execution of these steps or stages is not necessarily performed in sequence, but may be performed in turn or alternately with other steps or at least some of steps or stages of other steps.

Based on the same invention concept, the examples of this application further provide an apparatus for processing data in a frame synchronization game, which is configured to implement the above method for processing the data in the frame synchronization game. The implementation scheme provided by the apparatus to solve the problem is similar to the implementation scheme recorded in the above method. Therefore, specific limitations in the one or more examples of the apparatus for processing the data in the frame synchronization game provided below can refer to the limitations on the method for processing the data in the frame synchronization game mentioned above, and will not be repeated here.

Figure 11:
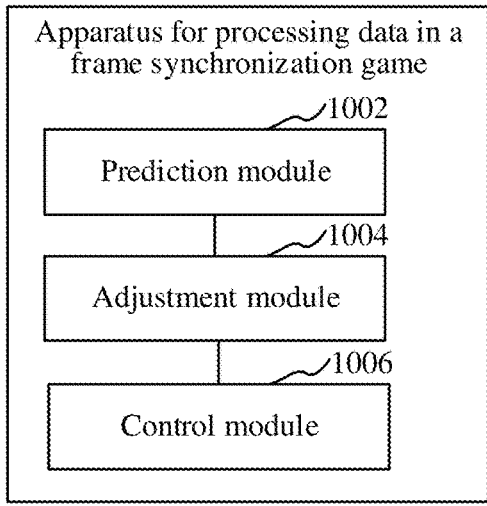
FIG. 11 is a block structural diagram of an apparatus for processing data in a frame synchronization game.

In one example, as shown in FIG. 11, an apparatus (e.g., computing device) for processing the data in the frame synchronization game includes:

a prediction module 1002, configured to predict a downlink network congestion trend according to a congestion condition of received downlink data frames;

an adjustment module 1004, configured to adjust a report time interval of uplink data frames on the basis of the downlink network congestion trend, the network congestion trend being in direct proportion to the report time interval; and a control module 1006, configured to transmit the uplink data frames to a game server according to the report time interval.

In another example, the prediction module includes:

a congestion value prediction module, configured to predict a congestion value of a next downlink data frame of each of the downlink data frames according to the congestion condition of the received downlink data frames; and a trend prediction module, configured to predict the downlink network congestion trend according to a predicted congestion value sequence of the downlink data frames.

In another example, the congestion value prediction module includes:

a congestion value calculation module, configured to determine a congestion value of each downlink data frame according to a difference value between a receiving time interval of two consecutive downlink data frames and a fixed transmitting interval of the downlink data frames; and a downlink prediction module, configured to predict the congestion value of the next downlink data frame according to the congestion value of the current downlink data frame and a current cumulative congestion value of the current downlink data frame.

In another example, the downlink prediction module is configured to: perform exponential smoothing processing on the congestion value of the current downlink data frame and the cumulative congestion value of the current downlink data frame, and predict the congestion value of the next downlink data frame, a weight of the congestion value of the current data frame being greater than a weight of the cumulative congestion value of the current downlink data frame.

In another example, a trend prediction module is configured to calculate a slope regression coefficient according to the predicted congestion value sequence of the downlink data frames; predict, in a case that the slope regression coefficient is greater than 0, that the downlink network congestion is in an uptrend; predict, in a case that the slope regression coefficient is less than 0, that the downlink network congestion is in a downtrend.

In another example, the apparatus further includes a network quality monitoring module, configured to: detect network quality; and in a case that it is determined, according to a network quality detection result, that the terminal is in a weak network environment, the prediction module is configured to execute predict the downlink network congestion trend according to the congestion condition of received downlink data frames.

In another example, the adjustment module is configured to: adjust, on the basis of the downlink network congestion trend, a transmitting frequency reported by the uplink data frames, where the transmitting frequency is decreased in a case that the downlink network congestion is in an uptrend, and the transmitting frequency is increased in a case that the network congestion is in a downtrend; and determine the report time interval of the uplink data frames according to the adjusted transmitting frequency.

Each module in the apparatus for processing the data in the frame synchronization game may be implemented entirely or partially through software, hardware, or a combination thereof. The above modules can be embedded in or independent of one or more processors in a computer device in a hardware form, or stored in a non-transitory computer-readable memory in the computer device in a software form, for the processor to invoke and execute the operations corresponding to the above modules.

Figure 12:
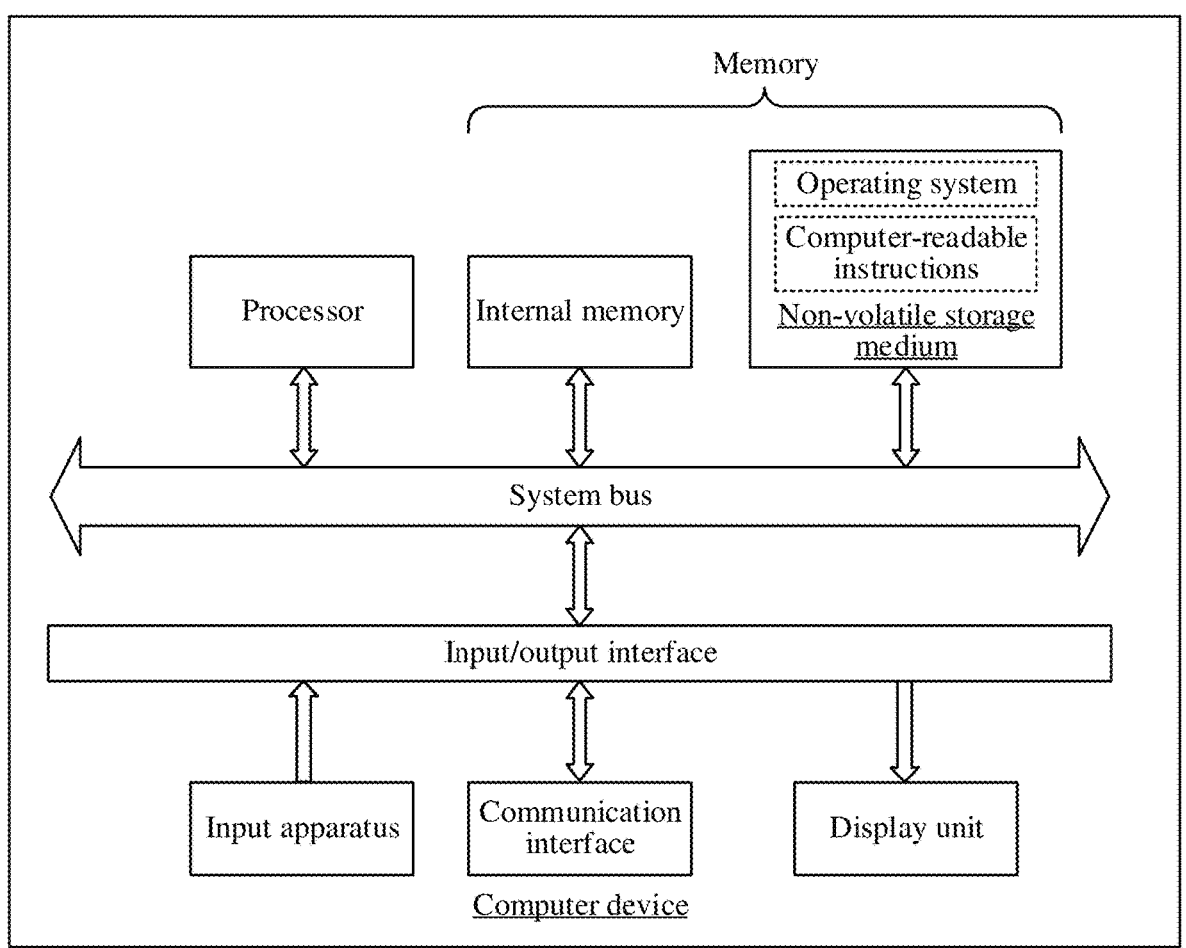
FIG. 12 is a diagram of an internal structure of a computer device.

In one example, a computer device is provided. The computer device may be a terminal, a diagram of an internal structure of which can be as shown in FIG. 12. The computer device may comprise a processor, a memory, an input/output interface, a communication interface, a display unit, and an input apparatus. The processor, the memory, and the input/output interfaces are connected through a system bus, while the communication interface, the display unit, and the input apparatus are connected to the system bus through the input/output interface. The processor of the computer device is configured to provide computation and control abilities. The memory of the computer device includes a non-volatile storage medium and an internal memory. The non-volatile and non-transitory storage medium stores an operating system and computer-readable instructions. The internal memory provides an environment for running the operating system and the computer-readable instructions in the non-volatile storage medium. The input/output interface of the computer device is configured to exchange information between the processor and an external device. The communication interface of the computer device is used for wired or wireless communication with an external terminal. The wireless manner can be achieved through WIFI, a mobile cellular network, Near Field Communication (NFC), or other technologies. The computer-readable instructions are executed by the processor to implement a method for processing data in a frame synchronization game. The display unit of the computer device is configured to form visual pictures, which may be a display screen, a projection apparatus or a virtual reality imaging apparatus. The display screen may be a liquid crystal display screen or an e-ink display screen. The input apparatus of the computer device may be a touch layer covering the display screen, or may be a button, a trackball, or a touchpad arranged on a housing of the computer device, or may be an external keyboard, touchpad, a mouse or the like.

A person skilled in the art may understand that, the structure shown in FIG. 12 is merely a block diagram of partial structures related to a solution in this application, and does not constitute a limitation on the computer device to which the solution of this application is applied. Specifically, the computer device may include more components or fewer components than those shown in the figure, or some components may be combined, or a different component deployment may be used.

In one example, a computer device is provided, including: a memory and a processor. The memory stores computer-readable instructions, and the processor, when executing the computer-readable instructions, implements the steps of the method for processing the data in the frame synchronization game of the various examples described above.

In one example, a non-transitory computer-readable storage medium is provided. The computer-readable storage medium stores computer-readable instructions. The computer-readable instructions, when executed by a processor, implement the steps of the method for processing the data in the frame synchronization game of the various examples described above. In one example, a computer program product is provided, including computer-readable instructions. The computer-readable instructions, when executed by a processor, implement the steps of the method for processing the data in the frame synchronization game of the various examples described above.

A person of ordinary skill in the art may understand that all or some of the procedures of the method in the foregoing examples may be implemented by the computer-readable instructions that instruct relevant hardware. The computer-readable instructions may be stored in a non-volatile computer-readable storage medium. When the computer-readable instructions are executed, the procedures of the foregoing method examples may be implemented. Any reference to the memory, the database, or other media used in the examples provided in this application can include at least one of a non-volatile memory and a volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, and the like. The volatile memory can include a random access memory (RAM), external cache memory, or the like. As an illustration, not a limitation, the RAM may be in many forms, such as a static random access memory (SRAM) or a dynamic random access memory (DRAM). The databases involved in the various examples provided in this application may include at least one of a relational database and a non-relational database. The non-relational database can include, but not limited to, a blockchain-based distributed database. The processors involved in the various examples provided in this application can be, but are not limited to, a general purpose processor, a central processing unit, a graphics processor, a digital signal processor, a programmable logic device, a data processing logic device based on quantum computation, and the like.

All the technical features of the above examples can be combined randomly. For the sake of brevity, all possible combinations of all the technical features in the above examples are not described. However, these technical features shall all be considered to fall within the scope of this specification as long as there is no contradiction in their combinations.

The foregoing examples merely express several implementations of this application. The descriptions thereof are relatively specific and detailed, but are not understood as limitations on the scope of this application. A person of ordinary skill in the art can also make several transformations and improvements without departing from the idea of this application. These transformations and improvements fall within the protection scope of this application.

19

20

What is claimed is:

1. A method for processing frame synchronization data, comprising:

predicting, by a computing device, a congestion value of a next downlink data frame based on a congestion condition of received downlink data frames, wherein the predicting the congestion value comprises:

determining a congestion value of each of the received downlink data frames according to a difference value between a receiving time interval of two consecutive downlink data frames and a fixed transmitting interval of the received downlink data frames; and predicting the congestion value of the next downlink data frame based on the congestion value of a current downlink data frame of the received downlink data frames and a current cumulative congestion value of the current downlink data frame; predicting a downlink network congestion trend based on the congestion value of the next downlink data frame;

adjusting a report time interval of uplink data frames based on the downlink network congestion trend; and transmitting the uplink data frames to a server based on the adjusted report time interval.

2. The method according to claim 1, wherein the predicting the congestion value of the next downlink data frame comprises:

performing exponential smoothing processing on the congestion value of the current downlink data frame and the current cumulative congestion value of the current downlink data frame; and predicting the congestion value of the next downlink data frame based on a weight of the congestion value of the current downlink data frame and a weight of the current cumulative congestion value of the current downlink data frame, the weight of the congestion value of the current downlink data frame being greater than the weight of the cumulative congestion value of the current downlink data frame.

3. The method according to claim 1, wherein the predicting the downlink network congestion trend based on the congestion value comprises:

calculating a slope regression coefficient based on a congestion value sequence of the received downlink data frames;

predicting, based on a determination that the slope regression coefficient is greater than 0, that the downlink network congestion is in an uptrend; and predicting, based on a determination that the slope regression coefficient is less than 0, that the downlink network congestion is in a down trend.

4. The method according to claim 1, further comprising:

detecting network quality of downlink transmission of the received downlink data frames, wherein the predicting the downlink network congestion trend comprises predicting, based on a determination that a result of the network quality indicates that the computing device is in a weak network environment, the downlink network congestion trend.

5. The method according to claim 1, wherein the adjusting comprises:

adjusting, based on the downlink network congestion trend, a transmitting frequency of the uplink data frames, wherein the transmitting frequency is decreased based on a determination that the downlink network congestion is in an uptrend, and the transmitting frequency is increased based on a determination that the downlink network congestion is in a down trend, and wherein the adjusting the report time interval of uplink data frames comprises determining the report time interval of the uplink data frames based on the adjusted transmitting frequency.

6. The method according to claim 1, wherein the downlink network congestion trend is in direct proportion to the report time interval.

7. An apparatus for processing frame synchronization data, the apparatus comprising circuitry configured to:

predict a congestion value of a next downlink data frame based on a congestion condition of received downlink data frames, wherein predicting the congestion value comprises:

determining a congestion value of each of the received downlink data frames according to a difference value between a receiving time interval of two consecutive downlink data frames and a fixed transmitting interval of the received downlink data frames; and predicting the congestion value of the next downlink data frame based on the congestion value of a current downlink data frame of the received downlink data frames and a current cumulative congestion value of the current downlink data frame;

predict a downlink network congestion trend based on the congestion value of the next downlink data frame;

adjust a report time interval of uplink data frames based on the downlink network congestion trend; and transmit the uplink data frames to a server based on the adjusted report time interval.

8. The apparatus according to claim 7, wherein the circuitry is configured to predict the congestion value of the next downlink data frame by:

performing exponential smoothing processing on the congestion value of the current downlink data frame and the current cumulative congestion value of the current downlink data frame; and predicting the congestion value of the next downlink data frame based on a weight of the congestion value of the current downlink data frame and a weight of the current cumulative congestion value of the current downlink data frame, the weight of the congestion value of the current downlink data frame being greater than the weight of the cumulative congestion value of the current downlink data frame.

9. The apparatus according to claim 7, wherein the circuitry is configured to predict the downlink network congestion trend based on the congestion value by:

calculating a slope regression coefficient based on a congestion value sequence of the received downlink data frames;

predicting, based on a determination that the slope regression coefficient is greater than 0, that the downlink network congestion is in an uptrend; and predicting, based on a determination that the slope regression coefficient is less than 0, that the downlink network congestion is in a down trend.

10. The apparatus according to claim 7, wherein the circuitry is configured to:

detect network quality of downlink transmission of the received downlink data frame; and predict the downlink network congestion trend by predicting, based on a determination that a result of the network quality indicates that the apparatus is in a weak network environment, the downlink network congestion trend.

11. The apparatus according to claim 7, wherein the circuitry is configured to adjust the report time interval by:

adjusting, based on the downlink network congestion trend, a transmitting frequency of the uplink data frames, wherein the transmitting frequency is decreased based on a determination that the downlink network congestion is in an uptrend, and the transmitting frequency is increased based on a determination that the downlink network congestion is in a down trend, and wherein the circuitry is configured to adjust the report time interval of uplink data frames by determining the report time interval of the uplink data frames based on the adjusted transmitting frequency.

12. The apparatus according to claim 7, wherein the downlink network congestion trend is in direct proportion to the report time interval.

13. A non-transitory computer-readable storage medium storing instructions, when executed, cause:

predicting, by a computing device, a congestion value of a next downlink data frame based on a congestion condition of received downlink data frames, wherein the predicting the congestion value comprises:

determining a congestion value of each of the received downlink data frames according to a difference value between a receiving time interval of two consecutive downlink data frames and a fixed transmitting interval of the received downlink data frames; and predicting the congestion value of the next downlink data frame based on the congestion value of a current downlink data frame of the received downlink data frames and a current cumulative congestion value of the current downlink data frame;

predicting a downlink network congestion trend based on the congestion value of the next downlink data frame;

adjusting a report time interval of uplink data frames based on the downlink network congestion trend; and transmitting the uplink data frames to a server based on the adjusted report time interval.

14. The non-transitory computer-readable storage medium according to claim 13, wherein the instructions, when executed, cause the predicting the congestion value of the next downlink data frame by causing:

performing exponential smoothing processing on the congestion value of the current downlink data frame and the current cumulative congestion value of the current downlink data frame; and predicting the congestion value of the next downlink data frame based on a weight of the congestion value of the current downlink data frame and a weight of the current cumulative congestion value of the current downlink data frame, the weight of the congestion value of the current downlink data frame being greater than the weight of the cumulative congestion value of the current downlink data frame.

15. The non-transitory computer-readable storage medium according to claim 13, wherein the instructions, when executed, cause the predicting the downlink network congestion trend based on the congestion value by causing:

calculating a slope regression coefficient based on a congestion value sequence of the received downlink data frames;

predicting, based on a determination that the slope regression coefficient is greater than 0, that the downlink network congestion is in an uptrend; and predicting, based on a determination that the slope regression coefficient is less than 0, that the downlink network congestion is in a down trend.

16. The non-transitory computer-readable storage medium according to claim 13, wherein the instructions, when executed, further cause:

detecting network quality of downlink transmission of the received downlink data frames, and wherein the instructions, when executed, cause the predicting the downlink network congestion trend by causing predicting, based on a determination that a result of the network quality indicates that a computing device is in a weak network environment, the downlink network congestion trend.

17. The non-transitory computer-readable storage medium according to claim 13, wherein the downlink network congestion trend is in direct proportion to the report time interval.

* * * * *